Oct. 21, 1924.                                  1,512,509
               S. T. THORPE
                FISHING ROD
             Filed Oct. 20, 1923
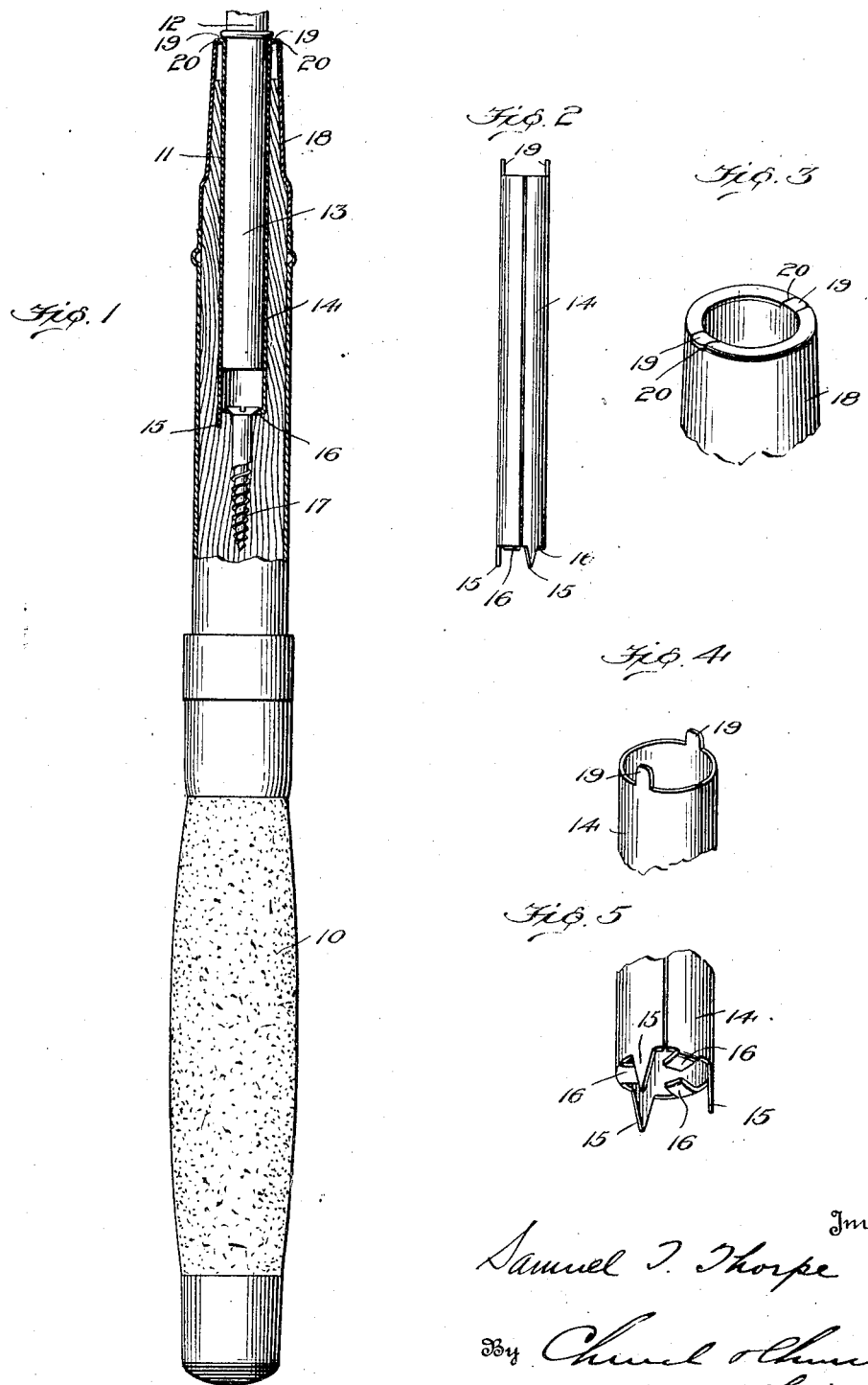

Patented Oct. 21, 1924.

1,512,509

UNITED STATES PATENT OFFICE.

SAMUEL T. THORPE, OF BRISTOL, CONNECTICUT, ASSIGNOR TO THE HORTON MANUFACTURING COMPANY, OF BRISTOL, CONNECTICUT, A CORPORATION OF CONNECTICUT.

FISHING ROD.

Application filed October 20, 1923. Serial No. 669,811.

*To all whom it may concern:*

Be it known that I, SAMUEL T. THORPE, a citizen of the United States, residing at Bristol, in the county of Hartford and State of Connecticut, have invented certain new and useful Improvements in Fishing Rods; and I do hereby declare the following to be a full, clear, and exact description of the same, reference being had to the accompanying drawings, forming a part of this specification.

This invention relates to fishing rods and more particularly to the handle or grip of fishing rods of the type wherein the rod proper is made in one or more sections that are detachably secured in the handle.

As is well known, the grip or handle of a metallic jointed rod is formed separately from any of the sections and is provided with a socket at one end designed to receive and frictionally hold the end of one of the sections, which is usually provided with a ferrule, the ferrule end of said section being forced into the handle socket when building up the rod. It is essential that the ferrule of the rod-joint be of such size with relation to the bore of the socket in the handle as to fit therein with the proper frictional contact. This has heretofore been accomplished by inserting a cylindrical sleeve or thimble in the socket that is free to expand when the ferrule is forced into it and which will compressingly frictionally grip the surface of said ferrule.

With such prior constructions in mind, the present invention seeks to provide a novel thimble for the handle socket, said thimble being formed with means for holding it against turning or rotation in the socket; with means for facilitating securing it in the socket; and with means for retaining the nickel trimming (usually a ferrule) on the socket end of the handle without the aid of the now generally used screw, quite a little difficulty having been encountered in holding the ferrule in place with the screw due, for one reason, to the screw working loose.

In the accompanying drawings—

Figure 1 shows a handle or grip of a sectional fishing rod, portions of the handle structure being broken away for purposes of better illustrating the present invention;

Fig. 2 is a view of the thimble removed from the handle;

Fig. 3 is a perspective view of one end of the thimble showing the means for securing the nickel trimming or ferrule on the handle. This view is somewhat enlarged.

Fig. 4 is a similar view of the opposite end of the thimble illustrating the means for holding the thimble against rotation in the handle and against longitudinal movement therein; and Fig. 5 is a detail view of the nickel trimming or ferrule for the handle.

The handle, intermediate its ends, has a somewhat rough, non-metallic surface 10, preferably cork, and its ends are covered with suitable nickel trimmings which give the finished handle a neat appearance. One end of the handle has a socket 11 for the inner section 12 of the rod, the ferrule 13 on said rod section being adapted to be inserted and frictionally held in the socket.

In order that the socket 11 may accommodate itself to a ferrule which may vary slightly in diameter, and thus obviate the necessity of specially fitting the sockets and ferrules to each other, there is fitted in the socket an expanding thimble 14, which thimble is made of a piece of sheet-steel rolled into cylindrical form, the meeting edges forming a joint or seam, not united, whereby the thimble is free to expand and grip the ferrule of the rod section when said ferrule is forced into the socket.

The inner end of the thimble has a plurality of projections formed thereon, six being shown in the accompanying drawings. A portion of these projections, the three indicated at 15 in the present instance, are made pointed or prong-like and are driven into the handle or grip at the inner end of the socket whereby the thimble will be prevented from turning in the socket should the rod section be turned with respect to the handle in disconnecting the two, as is frequently done. The other projections 16 on said thimble are bent inwardly of the thimble and form a restricted opening through which a fastening element, such as screw 17, may extend. The entire screw can pass through the thimble but the head of the screw will seat against the inner faces of the projections 16 when the screw is turned home in the handle at the inner end of the socket. In this way the thimble is securely held in the socket.

It is desirous to eliminate the use of the wood screw now generally utilized for holding the nickel trimming or ferrule 18 on the upper or socketed end of the handle and as the thimble 14 is firmly held against both longitudinal and rotary movement in the handle socket, means have been devised for connecting the thimble and said ferrule 18, whereby said ferrule is secured on the handle by the thimble alone. This is preferably accomplished by forming small ears 19, say two, on the upper or outer end of the thimble and a similar number of depressions or recesses 20 in the upper edge of ferrule 18.

After the parts have been assembled on the handle, said ears 19 are bent down into the depressions 20 in the ferrule flush with the upper face of the latter. The ferrule will then be firmly attached to the handle by the thimble alone, and as said thimble is held against rotation by prongs 15, the ears 19 cannot be displaced from the depressions in the ferrule.

What is claimed is:—

1. A fishing rod handle having a socket therein for one of the rod sections, a thimble in the socket, a screw securing the thimble at its inner end in the handle, a ferrule on the exterior of the handle having a depression therein, and a clip on the outer end of the thimble adapted to be bent over into the depression in the ferrule whereby the latter will be secured to the handle.

2. A fishing rod handle having a socket therein, a tubular thimble in the socket, the inner end of said thimble being provided with a plurality of pointed projections adapted to penetrate the bottom of the socket, a plurality of projections on said thimble end extending inward and forming a seat for a fastening element, a ferrule on the handle, and means on the outer end of the thimble for attaching the ferrule to the handle.

SAMUEL T. THORPE.